United States Patent [19]
Bucholtz et al.

[11] Patent Number: 5,005,677
[45] Date of Patent: Apr. 9, 1991

[54] ADJUSTABLE STOP FOR LOCKING DEVICE

[75] Inventors: Brian C. Bucholtz, Lakeview; Thomas J. Miller, Clarence, both of N.Y.

[73] Assignee: Enidine Incorporated, Orchard Park, N.Y.

[21] Appl. No.: 323,406

[22] Filed: Mar. 14, 1989

[51] Int. Cl.⁵ .......................... B60T 7/08; F16F 9/34
[52] U.S. Cl. ....................................... 188/299; 188/300
[58] Field of Search ..................... 188/299, 300, 317; 248/354.1; 267/64.12

[56] References Cited

U.S. PATENT DOCUMENTS

| | | | |
|---|---|---|---|
| 3,177,980 | 4/1965 | Porter et al. | 188/300 |
| 3,528,532 | 9/1970 | Moskow | 188/319 |
| 3,739,885 | 6/1973 | Porter et al. | 188/300 |
| 3,760,911 | 9/1973 | Porter et al. | 188/300 |
| 3,860,098 | 1/1975 | Porter et al. | 188/300 |
| 4,155,433 | 5/1979 | Porter | 188/300 |
| 4,671,392 | 6/1987 | Wössner | 188/299 |

*Primary Examiner*—Duane A. Reger
*Attorney, Agent, or Firm*—Edwin T. Bean, Jr.; Martin G. Linihan; John C. Thompson

[57] ABSTRACT

A stroke-limiting stop for a fluid locking device wherein movement between a piston and cylinder is influenced by fluid in the device, the stop comprising a housing having internal shape and dimension enabling one end of the cylinder to move longitudinally within at least one formation on the inner surface of the housing, and a stop element within the housing and having a portion adapted to engage the formation establishing a fixed position on the stop element along the housing longitudinal axis, the stop element being supported within the housing for movement between positions wherein the portion of the element either engages the formation or is out of engagement therewith with so that the stop element in the first position acts as an abutment to contact the cylinder upon movement into the housing thereby limiting the extent of relative movement between the piston and cylinder. When the stop element is in the second position it can be moved along the housing longitudinal axis to another formation to adjust the stop location. The locking device can be provided with a reserve fluid path and supply to compensate for leakage of working fluid and expansion and contraction of working fluid due to temperature changes. The locking device with the stop arrangement of the present invention can be employed in aircraft and vehicle seats for limiting the degree of rearward tilt of the seat back.

28 Claims, 5 Drawing Sheets

ADJUSTABLE STOP FOR LOCKING DEVICE

BACKGROUND OF THE INVENTION

This invention relates to the art of hydraulic cylinders, and more particularly to a new and improved stroke-limiting stop for hydraulic locking devices.

One area of use of the present invention is in hydraulic locking devices for adjusting the tilt of seat backs in aircraft and vehicle seats, although the principles of the present invention can be variously applied. Such devices are in the form of an hydraulic cylinder typically connected so that as the seat back is tilted rearwardly the device is compressed with the piston thereof being forced into the cylinder as fluid flows from one side of the piston to the other under control of a manually operated check valve. The maximum extent of movement of the piston into the cylinder, and hence the maximum degree of tilt of the seat back, is controlled by a stop arrangement associated with the device. For example, one prior art stop arrangement includes a cylindrical housing connected to the piston into which an end of the cylinder moves and which is provided with axially-spaced slots to receive an external stop element inserted into a selected slot for contacting or abutting the end of the cylinder thereby limiting the extent to which the cylinder can advance into the housing.

It would be highly desirable to provide a stop arrangement for an hydraulic locking device wherein an adjustable stop member is captive within the arrangement thereby avoiding its separation or loss from the arrangement. It also would be highly desirable to provide such a stop arrangement having a relatively large number of adjustable stop locations per unit length of piston travel, and to provide such a stop arrangement having increased strength and providing a relatively greater load distribution. In addition to providing an hydraulic locking device with a stop arrangement having the foregoing capabilities, it would be advantageous to provide means for compensating for expansion or contraction of the working fluid of the device due to temperature changes and for leakage of the working fluid.

SUMMARY OF THE INVENTION

It is, therefore, a primary object of the present invention to provide a new and improved stroke-limiting stop arrangement for hydraulic locking devices.

It is a more particular object of the present invention to provide such a stroke-limiting stop arrangement wherein an adjustable element is captive within the arrangement.

It is a further object of this invention to provide such a stroke-limiting stop arrangement having increased strength and improved load distribution.

It is a further object of this invention to provide such a stroke-limiting stop arrangement having a relatively larger number of adjustable stop locations per unit length of travel.

It is a further object of this invention to provide such a stroke-limiting stop arrangement which is conveniently manually adjustable.

It is a more particular object of this invention to provide such a stroke-limiting stop arrangement which positively maintains a stop location to which an adjustment is made.

It is a further object of this invention to provide compensation for expansion, contraction and leakage of working fluid in an hydraulic positioning device having a stroke-limiting stop arrangement.

The present invention provides a stroke-limiting stop arrangement for a fluid locking device of the type wherein relative movement between a piston and cylinder is influenced by fluid in the device, the stop arrangement comprising a housing associated with the cylinder and having internal shape and dimension enabling one end of the cylinder to move within the housing along the longitudinal axis thereof, at least one formation on the inner surface of the housing, and a stop element within the housing and having a portion adapted to engage the formation in a manner establishing a fixed position of the stop element along the housing longitudinal axis, the element being supported within the housing for movement between a first position wherein the portion of the element engages the formation and a second position wherein the portion is out of engagement with the formation, so that the stop element in the first position acts as an abutment to contact the cylinder upon movement into the housing thereby limiting the extent of relative movement between the piston and cylinder. When the stop element is moved to the second position it can be moved along the housing longitudinal axis to another formation thereby providing adjustment of the stop location. The locking device is provided with means for effecting the foregoing adjustment manually and in a manner locking the stop element at any location to which it is adjusted. The locking device can be provided with reserve fluid path and supply means to compensate for leakage of working fluid and expansion and contraction of working fluid due to temperature changes. The locking device with the stop arrangement of the present invention advantageously can be employed in a seat commonly found in aircraft and vehicles for limiting the degree of rearward tilt of the seat back.

The foregoing and additional advantages and characterizing features of the present invention will become clearly apparent upon a reading of the ensuing detailed description together with the included drawing wherein:

DETAILED DESCRIPTION OF THE ILLUSTRATED EMBODIMENT

In a basic stroke-limiting arrangement for an hydraulic locking device, a stop member extends across the space into which an end of the cylinder moves so as to abut the end of the cylinder and thereby limit the extent of relative movement in one direction between the piston and cylinder of the locking device. In the stroke-limiting stop arrangement of the present invention, a stop element is slidably and rotatably carried on a piston rod, and is located captively and entirely within a housing. The stop element is generally in the form of a disc and includes a glide ring portion fitted on the piston rod and a stop portion in the form of a ring fitted circumferentially on the glide ring. The stop ring has at least one lobe, preferably two, located diametrically opposite thereon, extending along a portion of the outer circumference of the ring, with the remainder of the circumference being of slightly smaller diameter. The housing is provided with formations on the inner wall thereof comprising a series of axially spaced arcuate grooves extending circumferentially relative to the housing. The grooves are adapted to slidably receive the lobe of the stop ring.

When the lobe of the stop ring is received in one of the grooves, the stop element is held or fixed at a particular axial location on the piston rod and serves to abut the end of the cylinder as it moves into the housing and thereby limit the extent of cylinder movement in that direction. The axial location of the stop element on the piston rod can be changed by turning or rotating the stop element on the piston rod to move the lobe out of the groove whereupon the stop element can be moved axially along the piston rod to be in registry with another one of the grooves whereupon the stop element is rotated to insert the lobe into the groove. This provides an adjustable limit on the extent of cylinder movement in the one direction. The captive arrangement advantageously avoids loss or separation of parts, the grooves provide improved handling of stress levels, the disc shape of the stop element provides increased strength and more uniform load distribution, and the provision of grooves and discs can provide a relatively wide adjustment range in an arrangement of relatively short axial length.

Figure 1:
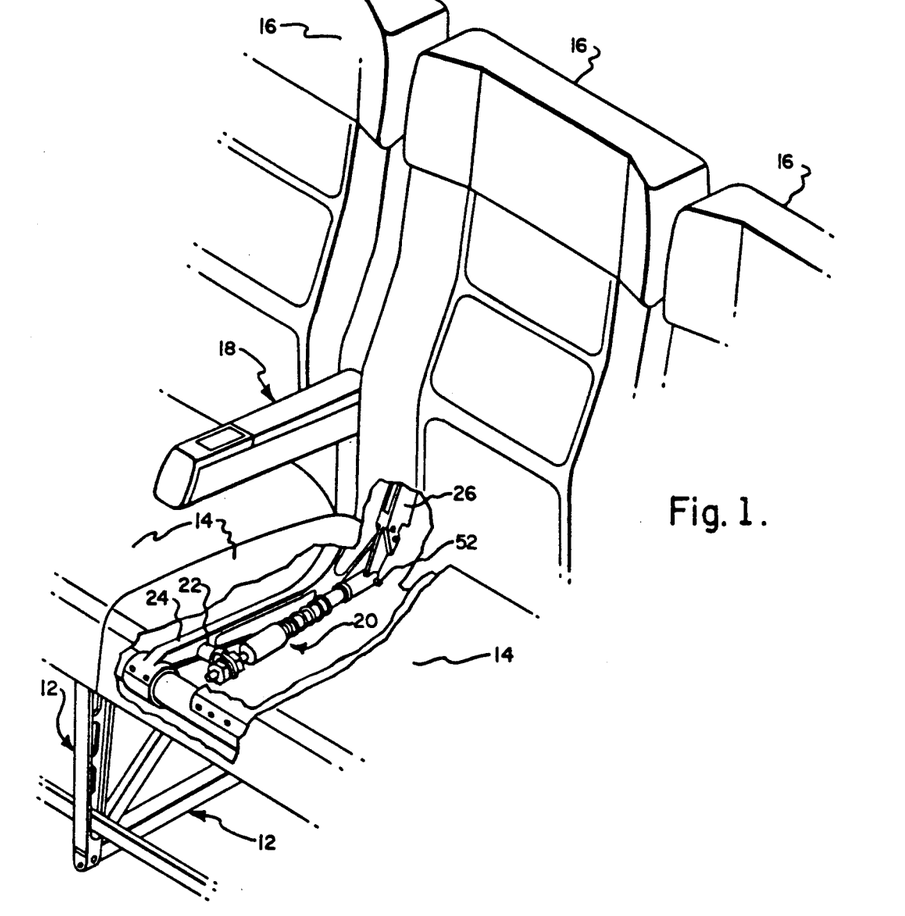
FIG. 1 is a fragmentary perspective view with parts removed of a seat assembly of the type commonly found on aircraft having a seat back tilt control device provided with the adjustment stop of the present invention.

FIG. 1 shows a seat assembly typically found in aircraft including a supporting frame structure 12, a seat bottom or cushion 14 supported on the frame and a seat back 16 pivotally mounted on the frame so as to be angularly adjustable between the forward or upright position shown in FIG. 1 and a rearwardly tilted position. Such seat structures also include arm rests, one of which is designated 18 in FIG. 1. There is provided an hydraulic locking device generally designated 20 connected to the frame and to the seat back 16 which permits the tilt of the seat back 16 to be adjusted by the user and held or locked in a selected position. In particular, locking device 20 is in the form of an hydraulic cylinder connected at one end by a bracket 22 to a member 24 of the seat frame and pivotally connected at the opposite end to a structural member 26 which is part of the structure of the seat back 16. Operation of locking device 20 is controlled by a manually-operated push button (not shown) typically located on arm rest 18 and which is connected to device 20 by a control wire or cable (not shown in FIG. 1), the foregoing arrangement being well known in the art so that a detailed description is believed to be unnecessary. An example of a typical control wire arrangement is found in U.S. Pat. No. 4,354,398 issued Oct. 19, 1982.

Figure 2:
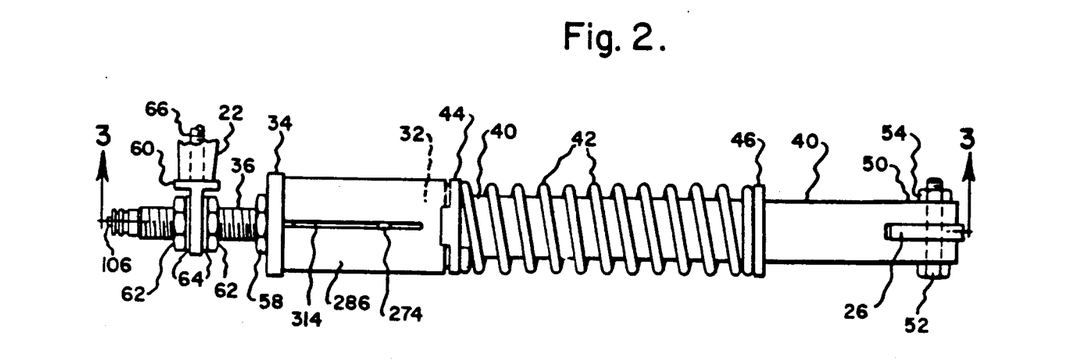
FIG. 2 is a top plan view of the control device shown in FIG. 1.

As shown in further detail in FIG. 2, locking device 20 includes a housing 32 in the form of a cylinder which is closed by an end plate or disc 34 fixed to a piston rod 36 having a threaded portion shown in FIG. 2. Housing 32 is open at the other end thereof to receive an elongated cylinder member 40 which extends into and is movable along within housing 32. A coil spring 42 is provided for biasing the relative movement between the cylinder 40 and housing 32, the spring encircling a portion of cylinder 40 and abutting at the opposite end thereof with spring retainers 44 and 46 on housing 32 and cylinder 40, respectively. The outer end of cylinder 40 is provided with a fitting 50 which has a longitudinal slot to receive the end of the structural member 26, pivotal connection being made by a bolt 52 extending through apertures in both components and held in place by a nut 54. The threaded portion of piston rod 36 extends out from the closed end of housing 32, the piston rod 36 extending through a central bore or aperture in plate 34 and through a nut 58 which is fastened on piston rod 36 against plate 34. Bracket 22 has an apertured fitting 60 which is received on piston rod 36 and held in place by nuts 62 and washers 64 and is fixed to seat frame member 24 by a suitable fastener 66.

In the illustrative arrangement of FIGS. 1 and 2, the hydraulic locking device 20 is mounted so that as seat back 16 is tilted rearwardly, device 20 is compressed. In particular, housing 38 is fixed by virtue of the fixed connection of piston rod 36 through bracket 22 to frame 24 and as seat back 16 is tilted rearwardly the pivot axis defined by bolt 52 moves forwardly, i.e. to the left as viewed in FIG. 2, with the result that cylinder 40 moves also to the left as viewed in FIG. 2 and along within housing 32.

Figure 3:
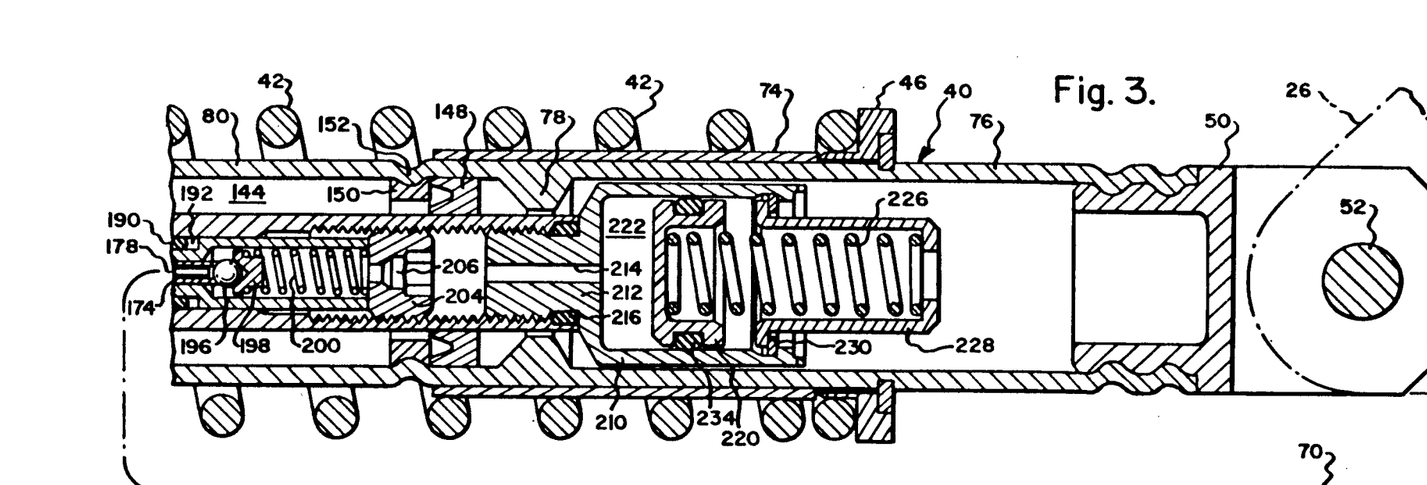
FIG. 3 is a longitudinal enlarged sectional view of the control device taken about on lines 3—3 in FIG. 2 and separated into two parts for convenience in illustration.

Referring now to FIG. 3, the longitudinal sectional view therein of device 20 is separated into two sections for convenience in illustration, it being understood that the sections come together as indicated by the broken line 70. As shown in FIG. 3, cylinder 40 is in the form of a cylindrical member which is closed at the outer end by fitting 50 which is staked or crimped into the open end of cylinder 40. A thin-walled cover sleeve 74 is fitted on cylinder 40 inwardly of retainer 46 to protect cylinder 40 from wear by spring 42. The cylinder 40 has a first section 76 of constant wall thickness extending from the end closed by fitting 50 toward the opposite end, a second or intermediate section 78 of larger wall thickness extending for a relatively short axial distance and a third section 80 of wall thickness substantially the same as that of the first section 76 and extending for the remainder of the length of cylinder 40. Section 80 terminates in an end face 82 which, as shown in FIG. 3, is located within the interior of housing 32. The device 20 is shown in an extended condition corresponding to seat back 16 being in a forward or upright position. When seat back 16 is tilted rearwardly to compress the device and move cylinder 40 further into the housing 32, end face 82 moves further into the interior of housing 32 to the left as viewed in FIG. 3. The extent to which end face 82 moves into housing 32, and hence the degree of permitted rearward tilt of seat back 16, is determined and controlled by the adjustment stop arrangement of the present invention associated with housing 32 and which will be described in detail presently.

Piston rod 36 is located within and in coaxial relationship with housing 32 and cylinder 40. Piston rod 36 has a substantially constant outer diameter proceeding axially from the outer threaded portion connected to bracket 22 inwardly along within housing 32 and along within cylinder 40. The outer end of shaft 36 located to the left of bracket 22 as viewed in FIG. 3 is internally threaded to receive a retainer 100. Retainer 100 is configured to receive the actuator attachment of the manual push-button control previously described. A pin 106 extends within a longitudinal bore or passage 108 in a portion of piston rod 36. Adjacent the inner end of retainer 100 is a combination of bushing 110, O-ring 112 and backup ring 114 through which a portion of pin 106 extends.

Piston rod 36 is provided with a plurality of radial bores or passages 120 at the inner portion thereof within cylinder 40. In the extended condition of device 20 illustrated in FIG. 3, passages 120 are in communication with an annular space defined between the respective end faces of a piston head 122 and a piston seal 124. Piston head 122 is integral with or fixed to piston rod 36 and is provided with an annular groove which holds a seal 126 and a spiral backup ring 128. One end face of seal 124 abuts a shaft bushing 130 which, in turn, abuts a wiper 132 held in place between bushing 130 and a retaining ring 134. The other end face of seal 124 contacts a seal retainer 136 held in place between seal 124 and a retaining ring 138. During compression of device 20 causing movement of cylinder 40 to the left as viewed in FIG. 3, the combination of seal 124, seal retainer 136, shaft bushing 130 and wiper 132 moves with cylinder portion 80 thereby defining an annular open region 140 of increasing volume between the end face retaining ring 138 and the end face of piston head 122 for receiving fluid flowing outwardly through passages 120 as will be described in detail presently.

An annular fluid-containing region 144 is defined within the inner and outer surfaces of cylinder section 80 and piston rod 36 respectively, and between the end face of shaft head 122 and a piston seal 148 located nearest intermediate cylinder section 78. The annular space between the inner surface of cylinder 40 near section 78 and the outer surface of piston rod 36 is sealed by the piston seal 148 held in place by retainer 150 contacting one end of seal 148 and held in place by engagement between an annular recess in the outer surface of retainer 150 fitting in an annular bead-like protuberance 152 in the inner wall of cylinder 40.

Piston rod 36 is provided with another longitudinal bore or passage 160 having a diameter larger than that of passage 108, the two passages 108 and 160 meeting at a junction surface 161. Piston rod 36 is provided with a plurality of radial bores or passages 162 extending into passage 160, the passages 162 providing fluid communication between region 144 and components within passage 160 which now will be described. A poppet seat element 166 is located at the end of passage 160 adjacent junction surface 161 and is provided with a longitudinal through bore or passage to receive the end of pin 106 and is provided with a surface 167 defining a poppet valve seat on the end thereof. A bushing 168 is located axially adjacent poppet seat element 166. The end of bushing 168 which abuts element 166 has an inner diameter larger than the valve seat 167 and an outer diameter less than that of the poppet seat element 166. This end of bushing 168 is provided with a plurality of radial bores or apertures 170 in general alignment with passages 162 in piston rod 36. Bushing 168 has a central portion having an outer diameter substantially equal to the inner diameter of piston rod 36 so as to fit snugly therein. The remaining portion of bushing 168 has a longitudinal through bore or passage which slidably receives a poppet 174 having a semi-spherical formation on one end contacting the valve seat portion 167 of element 166 and being generally cylindrical along the remainder of the length thereof to fit within bushing 168. Poppet 174 has a longitudinal through bore or passage which receives a shutoff pin 178, one end of which is adjacent the end of pin 106 and the other end of which is adjacent the opposite end of poppet 174.

There is provided a sleeve element 182 snuggly received in passage 160 and having one end abutting bushing 168, a central portion slidably embracing poppet 174 and an opposite end extending axially beyond poppet 174. A central portion of sleeve 182 has the smallest inner diameter. The end of sleeve 182 abutting bushing 168 has a relatively larger inner diameter so as to fit onto and over the end of bushing 168. The annular region defined between this end of sleeve 182 and the outer surface of poppet 174 contains a seal ring 186 and a backup ring 188. Sleeve 182 is provided with an annular recess in the outer surface thereof axially adjacent the central portion thereof and containing a seal ring 190 and a backup ring 192. The remainder of sleeve 182 is of substantial axial length and has an inner diameter substantially the same as that of the opposite end portion. The interior region of this portion of sleeve 182 contains an arrangement of a ball valve element 196 normally contacting the end of poppet 174, a retainer element 198 contacting ball 196, and a spring 200 for biasing the ball 196 into contact with poppet 174 and having one end abutting ball retainer 198 and the opposite end abutting another retainer element 204 which is threaded into the end of piston rod 36 and which abuts the end of sleeve 182 to hold poppet seat element 166, bushing 168 and sleeve 182 in place. Retainer 204 is provided with a central through passage 206 for flow of fluid.

A reserve piston and cylinder combination is provided in fluid communication with the foregoing arrangement. A reserve cylinder 210 is located within cylinder portion 76 and has a neck 212 which is threaded into the end of piston rod 36. Neck 212 has a central bore or passage 214 providing fluid communication between the interior of cylinder 210 and passage 206 of retainer 204. An O-ring 216 provides a seal between neck 212 and the inner surface of piston rod 36. A piston 220 is located within cylinder 210 thereby defining an interior fluid-containing region 222 between piston 220 and neck 212. A biasing spring 226 also is provided, one end of which abuts the opposite side of piston 220 and the other end of which abuts a spring retainer 228 held in place at the end of cylinder 210 by a retaining ring 230 fitted in an annular groove or recess in the inner wall of cylinder 210. The outer surface of piston 220 is provided with an annular groove or recess containing a sealing ring or gasket 234.

Referring now to FIGS. 4-8 in conjunction with FIG. 3 the adjustment stop arrangement of the present invention is associated with the housing 32. As previously mentioned, during rearward tilting of seat back 16, device 20 is compressed and the end of cylinder portion 80 including end face 82 moves into housing 32, the inner surface of which has a cross sectional dimension accommodating such movement. The degree or extent of such movement of cylinder 40 in a longitudinal direction is selectively established by adjustable stop means generally designated 240 in FIG. 3 and located within housing 32 so as to abut the end face 82 and hence stop further longitudinal movement of cylinder 40 in the one direction corresponding to compression of the device. In other words, the degree of rearward tilt of seat back 16 is determined by the distance between the location of end face 82, which is shown in FIG. 3 corresponding to the up right position of seat back 16, and the location of stop means 240. Furthermore, this degree of tilt can be adjusted by changing the location of stop means 240 within housing 32.

Figure 4:
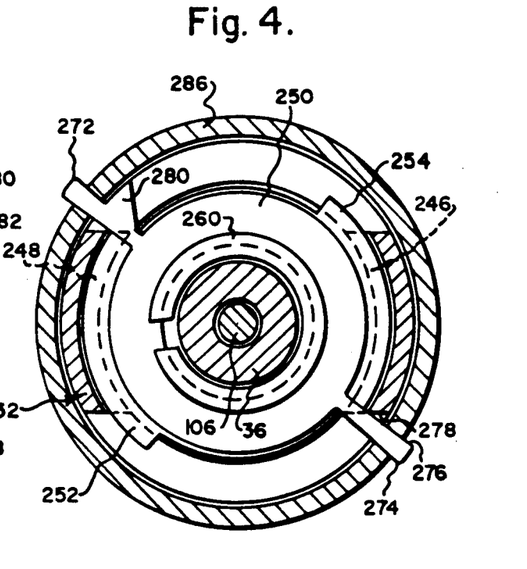
FIG. 4 is a cross sectional view taken about on line 4—4 in FIG. 3 and illustrating the adjustment stop of the present invention with the stop ring in the locked position.
Figure 10:
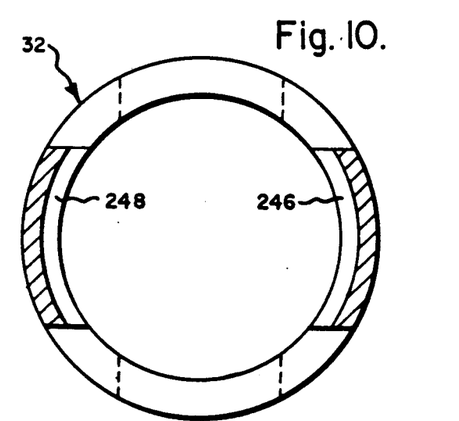
FIG. 10 is a cross-sectional view of the housing in the assembly of FIGS. 4 and 5.
Figures 11, 12, 15, 16:
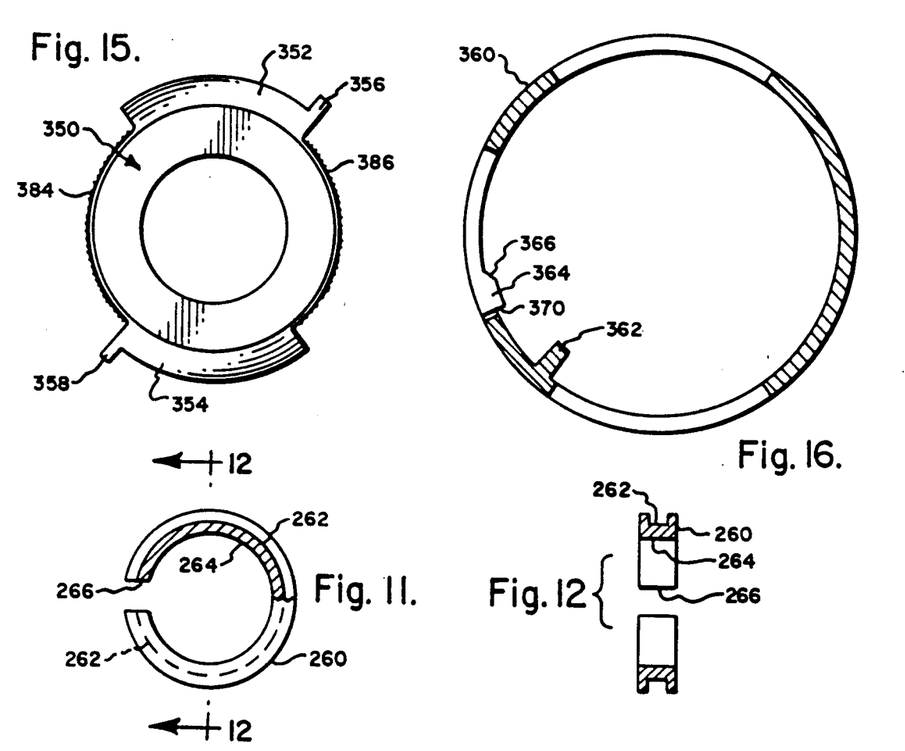
FIG. 11 is an elevational view of the glide ring in the assembly of FIGS. 4 and 5.
FIG. 12 is a sectional view taken about on lines 12—12 in FIG. 11.
FIG. 15 is an elevational view of a stop ring in the arrangement of FIGS. 4 and 5.
FIG. 16 is a sectional view of a cover in the arrangement of FIGS. 4 and 5.

In particular, there is provided at least one formation on the inner surface of housing 32 adapted to receive a component of the stop means 240 in a manner establishing a fixed position of the stop means along the longitudinal axis of housing 32. In the arrangement shown, the formation at the location of stop means 240 shown in FIG. 3 includes a first arcuate recess or groove 246 extending along a section or length of the circumference of the inner surface of housing 32, in particular along the inner surface of a wall of housing 32. The formation includes a second arcuate recess or groove 248 as shown in FIG. 4 and 10 extending along another section or length of the circumference of the inner surface of housing 32, in particular along the inner surface of the diametrically opposite wall of housing 32. Grooves 246, 248 are in face-to-face opposition, i.e. diametrically opposed, and extend along a common plane disposed perpendicular to the longitudinal axis of housing 32 and the axis of piston rod 36. The illustrative device shown includes a plurality of formations in axially spaced relation along housing extension 32, in particular the three additional grooves 246a, 246b and 246c on the one wall of housing 32 which are in registry with three corresponding grooves (not shown) on the opposite wall of housing 32. Thus, while four such formations have been illustrated in FIG. 3, a smaller or larger number of such formations can be provided.

The stop means comprises a stop member or element 250 in the general form of a ring having formations in the shape of lobes or lands 252, 254 along diametrically opposed portions of the periphery thereof which formations 252 and 254 fit into the grooves 246 and 248, respectively located on diametrically opposed walls of housing 32. The formations or lobes 252, 254 are of a thickness such that they fit or are received firmly yet movably in grooves 246, 248. Furthermore, both the grooves 246, 248 and the lobes 252, 254 are of an arcuate length such that in one rotational position of stop member 250 the lobes 252, 254 are received in or in engagement with the grooves 246, 248 and in another rotational position of stop member 250 the lobes 252, 254 are out of engagement with the grooves 246, 248.

Figure 5:
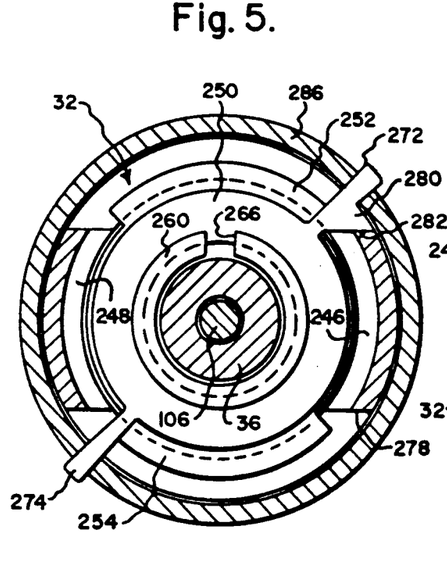
FIG. 5 is a view similar to FIG. 4 showing the stop ring in an unlocked position adapted for movement to another adjustment stop position.
Figure 6:
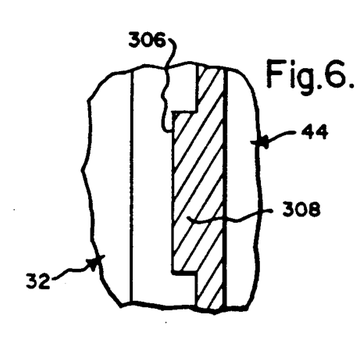
FIG. 6 is a sectional view taken about on line 6—6 in FIG. 3.

There is provided means including the piston rod 36 for supporting stop means 240 within housing 32 for movement between a first position, shown in FIG. 4, wherein the portion 252, 254 of stop member 250 engages the housing formation 246, 248 and a second position shown in FIG. 5, wherein the portion 252, 254 of stop member 250 is out of engagement with the formation 246, 248. Stop member 250, being in the form of a ring, is fitted onto the periphery of a glide ring member 260 which, in turn, is rotatably carried on piston rod 36. In particular, glide ring 260 has a thickness slightly greater than that of stop member 250 as shown in FIG. 3, is provided with an annular groove or recess 262 in the periphery thereof unto which stop member 250 is snap-fitted, and is provided with a central aperture 264 enabling it to be received snuggly but rotatably and axially movable on piston rod 36. Glide ring 260 is provided with a notch or opening 266 shown in FIGS. 4 and 5 enabling it to be slightly radially compressed to facilitate snap-fitting of stop member 250 thereon. By virtue of glide ring 260 being rotatable on piston rod 36, stop member 250 is movable between the positions into and out of engagement with formations 246, 248 as illustrated in FIGS. 4 and 5. Also, by virtue of glide ring 260 being axially movable along piston rod 36, when stop member 250 has been rotated to the position shown in FIG. 5, it can be moved axially along piston rod 36 to be in registry with another one of the formations for adjustment of the stop as will be described. In addition, the foregoing rotational and axial movements of stop member 250 can be effected and maintained in a convenient and effective manner by manipulation of components of the device which will be described.

Thus, when stop member 250 is in a first position in engagement with the formation 246, 248 as shown in FIG. 4, it acts as an abutment to contact cylinder 40, in particular end face 82 thereof, upon movement of cylinder 40 into housing 32 thereby limiting the extent of relative movement between cylinder 40 and housing 32. This, in turn, limits the degree of backward or rearward tilt of seat back 16 in the arrangement of FIG. 1. The axial location of stop member 250 in the arrangement illustrated in FIG. 3 provides a relatively small degree of tilt of the seat back 16. A larger degree of tilt can be provided by moving the stop member 250 along piston rod 36 as previously described until it is registry with one of the other formations, for example 246b to the left as viewed in FIG. 3, and then rotating it to place the stop member portions or lobes 252, 254 into engagement with the groove 246b and its counterpart.

There is provided means operatively associated with stop means 240 and housing 32 for effecting the foregoing adjustments and maintaining or locking the adjustment once made. Stop means 240 is provided with operator means in the form of a pair of radially outwardly extending fingers 272, 274 at diametrically opposite locations on the circumference of stop member 250. The fingers 272, 274 are located adjacent the ends of corresponding areas of the lobes 252, 254. In particular a first finger 272 is located adjacent an end of lobe 252 and a second finger 274 is located adjacent an end of lobe 254. The angular distance between fingers 272 and 274 is 180° in the device shown.

There is also provided means associated with stop means 240 for limiting the extent of rotation of stop member 250 in housing 32. Referring to FIG. 4, a surface 276 of finger 274 contacts or engages a surface 278 in housing 32 to prevent any further rotation of stop member 250 in a counter-clockwise direction as viewed in FIG. 4. A formation 280 on finger 272 contacts or engages a surface 282 in housing 32 to prevent any further rotation of stop member 250 in a clockwise direction as viewed in FIG. 5.

Figure 7:
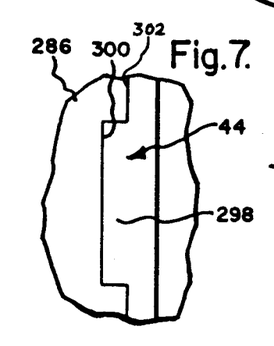
FIG. 7 is a fragmentary elevational view taken about on line 7—7 in FIG. 3 showing the housing cover in a locked condition.
Figure 8:
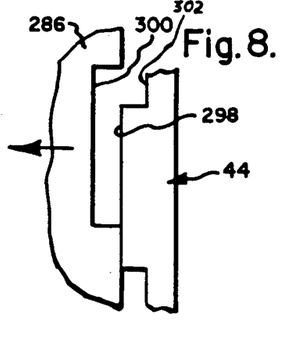
FIG. 8 a view similar to FIG. 7 showing the housing cover in an unlocked condition.
Figure 9:
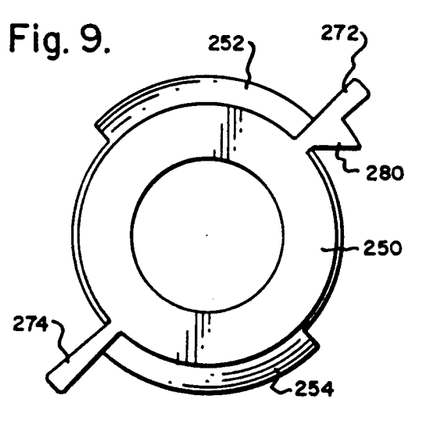
FIG. 9 is an elevational view of the stop ring of FIGS. 4 and 5.

The operator means in the form of fingers 272, 274 is operatively connected to a cover 286 rotatably and axially movably mounted on housing 32 in a manner such that movement of cover 286 rotates stop member 250 between the positions of FIGS. 4 and 5 with lobes 252 and 254 into and out of engagement, respectively, with the grooves 246, 248 and such that movement of fingers 272, 274 relative to cover 286 moves stop member 240 along shaft 36 between the axially spaced grooves 246, 246a, 246b, 246c. Cover 286 is in the form of a thin-walled transparent cylinder having one end received in an annular groove 292 provided in end cap member 34 and containing a spring 294 and having the other end engaging spring retainer 44. In particular, as shown in FIGS. 7 and 8 spring retainer 44 is provided with a key formation 298 extending from the axial end face 302 thereof and cover 286 is provided with a key-way formation 300. FIG. 7 illustrates the condition of cover 286 locked against rotation relative to housing 32 with key-way 300 urged into key 298 by the force of spring 294. When it is desired to rotate cover 286 to rotate stop member 250 as will be described, cover 286 is grasped by hand and moved axially to the left as viewed in FIG. 3 against the force of spring 294 to disengage key-way 300 from key 298 as shown in FIG. 8 so as to allow rotation of cover 286 relative to housing 32. When cover 286 is rotated, the end face of cover 286 moves along the key surface of spring retainer 44. As shown in FIG. 8, a key-way formation 306 on a portion of housing 32 is permanently fitted in a key formation 308 on spring retainer 44 to lock the two components against relative rotation.

Cover 286 is provided with a pair of longitudinally extending slots 312 and 314 at diametrically opposite locations on the wall of cover 286. Each slot 312, 314 extends from the end adjacent end cap 34 along a major portion of the length of cover 286. Slots 312 and 314 are of a width and are so located to receive the outer ends of fingers 272 and 274, respectively as shown in FIGS. 3-5. Slots 312, 314 are of an axial length sufficient to extend along an axial path parallel to a path containing the grooves 246, 246a, 246b and 246c as shown in FIG. 3.

When it is desired to change the axial location of stop member 250 to a different one of the grooves 246, 246a, 246b or 246c, for the purpose of adjusting the maximum degree of tilt of seat back 16 as previously described, cover 286 is grasped by hand, moved axially to the left as viewed in FIG. 3 to disengage key-way 300 from key 298 as shown in FIG. 8, and then rotated as far as possible and rotating stop member 250 with it to the position illustrated in FIG. 5 where formation 280 abuts housing surface 282. Stop member 250 is rotated by cover 286 by virtue of fingers 272 and 274 being received in cover slots 312 and 314, respectively. At this rotational position of stop member 250, lobes 252, 254 are disengaged from the housing grooves, and stop member 250 is free to be moved axially along piston rod 36. Then the tips of fingers 272, 274 protruding from slots 312, 314 are manually grasped and moved along slots 312, 314 to move stop member 250 axially along piston rod 36 to a new location in rotational alignment with another one of the grooves 246, 246a, 246b or 246c. This can be facilitated by observing various axial groove locations through transparent cover 286. When the desired axial location is reached, cover 286 is rotated by hand in a return direction whereupon key-way 300 is urged into key 298 and the assembly is locked in the position of FIG. 4. Stop member 250 has been rotated with cover 286 to place lobes 252, 254 in engagement with the particular one of the housing grooves at the new location.

The foregoing arrangement provides axial adjustment of stop member 250 in a convenient and easy manner by operating and maintenance personnel. Furthermore, it provides an effective means for locking and maintaining a selected axial location of stop member 250 so as to avoid any undesired movement of stop member 250 from that axial location, once an adjustment has been made.

The hydraulic locking device 20 operates in the following manner. As previously described, device 20 is shown in FIG. 3 in an extended condition corresponding to seat back 16 being in a full upright position. When the occupant wishes to tilt seat back 16 rearwardly, he operates the push button (not shown) of the seat back control in a known manner, the button typically being located on the arm rest 18 as previously described. Operation of the control to allow tilting of seat back 16 is coupled or communicated mechanically to move pin 106 to the right as viewed in FIG. 3. Movement of pin 106, in turn, unseats poppet 174 thereby allowing fluid to flow from region 144, through passages 162 in piston rod 36, through passages 170 in bushing 168, between poppet 174 and seat element 166, along within the longitudinal bore of seat element 166, through passages 120 in piston rod 36 and into the region 140 between piston head 122 and seal 124. As seat back 16 is tilted rearwardly, cylinder 40 moves against the force of spring 42 and further into housing 32 resulting in a decreasing volume of region 144 and an increasing volume of the region 140 to accommodate the foregoing flow of fluid. This continues until the occupant releases the push button at which time the pin 106 moves to the left as viewed in FIG. 3 and poppet 174 returns to the seated condition in contact with seat element 166 thereby stopping fluid flow. Thus, the seat back 16 is held or maintained in this locked position at the selected degree of tilt. The maximum extent of the foregoing rearward tilting movement of seat back 16 is limited by the extent of movement of cylinder 40 into housing 32 which is determined by the location of stop member 250 which end face 82 of piston 40 eventually will contact or abut.

When it is desired to return seat back 16 forwardly, either to an intermediate or a full upright position, the occupant again operates the push button to move pin 106 to the right as viewed in FIG. 3 thereby unseating poppet 174 and providing fluid communication between region 144 and the region 140. At the same time the occupant moves or leans slightly forwardly in a known manner thereby allowing spring 42 to return cylinder 40 to an extended position, i.e. move cylinder 40 to the right as viewed in FIG. 3. This results in fluid flow in a reverse direction, i.e. from the region 140 to the region 144. If the movement to an intermediate position is desired, the occupant releases the push button when that position is reached to seat poppet 174 and stop fluid flow, otherwise spring 42 returns cylinder 40 to a fully extended position during continued fluid flow with the push button remaining depressed thereby returning seat back 16 to a full upright position.

During the foregoing operation when pin 106 is moved to the right as viewed in FIG. 3 unseating poppet 174 and allowing the afore-described fluid flow, which can be designated the working fluid flow, the interior of reserve cylinder 210 is placed in communication with the working fluid flow in the following manner. When pin 106 is moved to the right as viewed in FIG. 3, the end thereof contacts the end of shutoff pin 178 moving it to the right as viewed in FIG. 3 and unseating ball 196 from the end of poppet 174. A path for flow of fluid thus is provided from the interior of reserve cylinder 210, through passage 214 in neck 212, through passage 206 in retainer 204, along the interior of sleeve element 182, and along within the longitudinal passage in poppet 174 containing pin 178. This may be designated the reserve fluid flow. As a result, reserve fluid within cylinder 210 under the force of spring-biased piston 220 is supplied to the working fluid to compensate for contraction of the working fluid due to temperature decreases and to make up for any leakage of working fluid. Similarly, any expansion of the working fluid due to temperature increases is relieved by the flow of expanded fluid along the reserve fluid flow path into cylinder 210 against the force of piston 220. When pin 106 moves in a return or leftward direction as viewed in FIG. 3, ball 196 is returned by spring 200 into contact with the end of poppet 174 thereby blocking the flow of fluid in the reserve path.

The stroke-limiting stop according to the present invention provides a number of important advantages. The stop means 240 comprising the grooves of formations 246, 248 and the stop member 250 is captive within the locking device 20 thereby never leaving the device. This avoids any problem of the two parts becoming separated from one another. This, in turn, eliminates the possibility of loss of parts during shipment which can be a significant problem with large aircraft containing several hundred seats. The grooves 246, 248 provide a relatively significant length of engagement with the stop member thereby resulting in improved handling of mechanical stress levels. The stop member 250 being in the form of a disc or washer has considerable strength for abutting the end of cylinder 40, and the fact that stop member 250 engages the end of cylinder 40 around the entire circumference provides improved load distribution. The grooves 246, 248 can be spaced axially in relatively close relation, and this together with the fact that stop member 250 and glide ring 260 can be relatively thin provides a relatively wide range of adjustment in an arrangement of relatively short axial length. The adjustments in location of stop member 250 to adjust the maximum degree of rearward tilt of the seat lock can be made manually, without need for any special tools, and in a convenient and relatively quick manner. The combination of cover 286 and fingers 272, 274 of stop member 250 operatively connected to cover 286 allows convenient and effective axial adjustment of stop member 250 with the additional advantage of insuring that the stop member 250 is maintained in the adjusted position. The provision of the reserve fluid path and piston 220-cylinder 210 combination compensates for changes in the pressure of the working fluid in the positioning device due to temperature changes and leakage.

Figure 13:
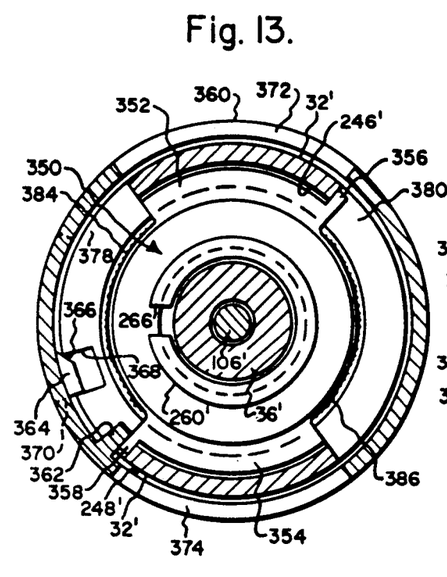
FIG. 13 is a view similar to FIG. 4 illustrating an arrangement according to another embodiment of the present invention.

FIGS. 13-16 illustrate an alternative arrangement wherein a cover is rotatable on the housing between a closed position holding the stop member in place and an open position allowing manual access to the stop member for adjusting its axial location. For convenience in illustration, components in FIGS. 13-16 identical to components in the embodiment of FIGS. 1-12 are identified by the same reference numeral with a prime designation. FIG. 13 shows stop member 350 of this embodiment in a position with lobes 352 and 354 received in grooves 246' and 248' of housing 32'. Stop member 350 is provided with radially outwardly extending ears 356 and 358 adjacent the ends of lobes 352 and 354, respectively, for engaging corresponding surfaces in housing 32' to limit further rotation of stop member 350 on shaft 36' in one direction, i.e. counterclockwise as viewed in FIG. 13. A cover 360 in the form of a thin-walled cylinder of flexible, transparent material, preferably plastic, is rotatably mounted on housing 32'. Cover 360 is provided with a radially inwardly extending ear 362 which, in the closed position of FIG. 13 abuts ear 358 of stop member 350 to limit further rotation of stop member 350 on piston rod 36' in the opposite direction, i.e. clockwise in FIG. 13. Accordingly, when cover 360 is in the closed position, the rotational position of stop member 350 is fixed or maintained. Cover 360 also is provided with a radially inwardly extending formation 364 spaced circumferentially a relatively short distance from ear 362 and having an inclined or ramp-like surface 366 facing in the direction which cover 360 is rotated to an open position as will be described. In the closed position of cover 360 shown in FIG. 13, formation 364 is received in a recess 368 provided in the outer surface of housing 32'. A slot 370 is provided in the wall of cover 360 to permit radial outward flexing of formation 364 when cover 360 is rotated to an open position as will be described. In order to allow access to stop member 350 for adjusting same, cover 360 is provided with a pair of openings or windows 372 and 374 on diametrically opposite portion of the cylindrical wall of cover 360. Each opening 372, 374 is of sufficient circumferential dimension to permit manual access to stop member 350 for adjustment thereof, and each opening extends longitudinally along the portion of housing 32' including the grooves or formations into which stop member 350 is axially adjusted. In the closed position of cover 360 shown in FIG. 13, windows 372, 374 are closed, being in registry with corresponding outer wall portions of housing 32'.

Figure 14:
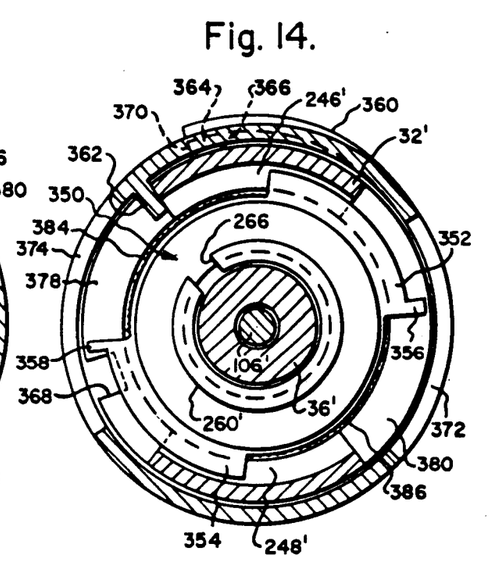
FIG. 14 is a view similar to FIG. 51 and further illustrating the arrangement of FIG. 13.

When it is desired to change the axial location of stop member 350 on piston rod 36' i.e. move it into engagement with one of the other axially spaced grooves or formations on the inner wall of housing 32', cover 360 is grasped by hand and rotated in a clockwise direction as viewed in FIG. 13 to the position shown in FIG. 14 where cover openings 372 and 374 are in registry with openings 378 and 380, respectively, in the wall of housing 32'. During this movement of cover 360, formation 364 flexes radially outwardly from recess 368, this being facilitated by surface 366, and the inner surface of formation 364 rides along the outer surface of housing 32'. Further rotation of cover 360 in the opening direction is limited by engagement between ear 362 and an inner surface of housing 32' as shown in FIG. 13. With cover 360 in the open position, the person making the adjustment reaches in with a finger to manually rotate stop member 350 to a position where lobes 352 and 354 are out of engagement with housing grooves 246' and 248'. FIG. 14 illustrates stop member 350 at a position about mid-way during such rotation which is in a clockwise direction as viewed in FIG. 14. To facilitate the foregoing, stop member 350 is provided with knurled surface portions 384 and 386 on diametrically opposite surface portions thereof. When stop member 350 is rotated to disengage lobes 352 and 354 from grooves 246' and 248' it is moved manually along piston rod 36' to an axial location in registry with another set of the housing grooves or formations and then rotated by hand in the opposite directions, i.e. counterclockwise as viewed in FIG. 14, to place lobes 352 and 354 in engagement with these grooves. Then cover 360 is rotated by hand back to the closed position of FIG. 13, and the adjusted position of stop member 350 is maintained by the ears 356, 358 thereof and ear 362 of cover 360 as previously described.

Figure 17:
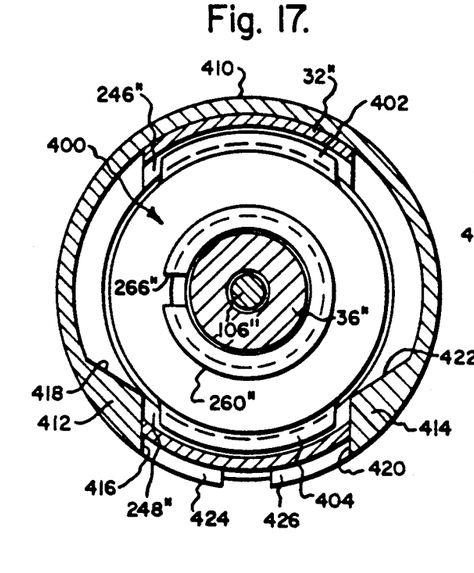
FIG. 17 is a view similar to FIG. 4 illustrating an arrangement according to another embodiment of the present invention.

FIGS. 17–20 illustrate another alternative arrangement wherein a cover is rotatable on the housing between a closed position and an open position allowing manual access to the stop member for adjusting its axial location. For convenience in illustration, components in FIGS. 17–20 identical to components in the embodiment of FIGS. 1–12 are identified by the same reference numeral with a double prime designation. FIG. 17 shows stop member 400 of this embodiment with lobes 402 and 404 received in grooves 246" and 248". A cover 410 in the form of thin-walled cylinder of flexible transparent material, preferably plastic, is rotatably mounted on housing 32". In order to allow access to stop member 400 for adjusting same, cover 410 is provided with an opening along one portion of the cylindrical wall thereof extending from one end and terminating a short distance from the opposite end. In particular, the opening is defined between a pair of circumferentially spaced apart, radially inwardly extending formations 412 and 414. Formation 412 has a first surface 416 defining one edge or side of the opening and a second inclined or ramp-like surface 418. Similarly, formation 414 has a first surface 420 defining the other edge or side of the opening and a second inclined or ramp-like surface 422. The far end of the opening as viewed in FIG. 17 is defined by the surfaces 424 and 426 of a portion of the wall of cover 410. The opening is of sufficient circumferential dimension to permit manual access to stop member 400 for adjustment thereof, and the opening extends longitudinally along the portion of housing 32" including the grooves or formations into which stop member 400 is axially adjusted. In the closed position of cover 410 shown in FIG. 17, the opening is closed by virtue of its being in registry with an outer wall portion of housing 32".

Figure 18:
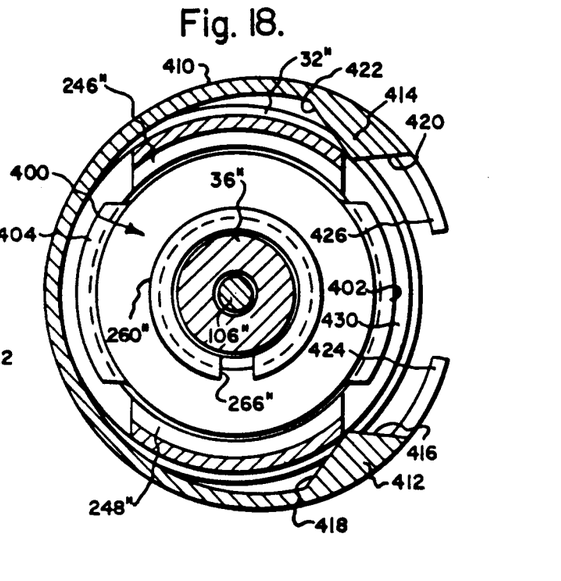
FIG. 18 is a view similar to FIG. 5 and further illustrating the arrangement of FIG. 17.
Figure 19:
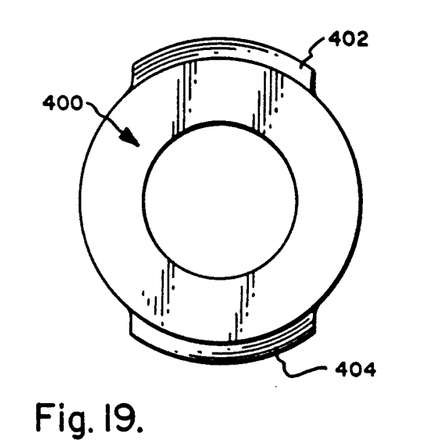
FIG. 19 is an elevational view of a stop ring in the arrangement of FIGS. 4 and 5.
Figure 20:
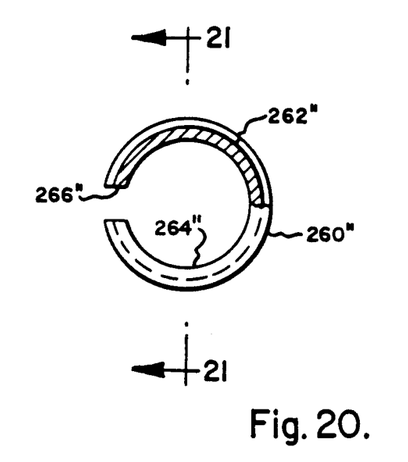
FIG. 20 is an elevated view of a glide ring in the arrangement of FIGS. 4 and 5.
Figure 21:
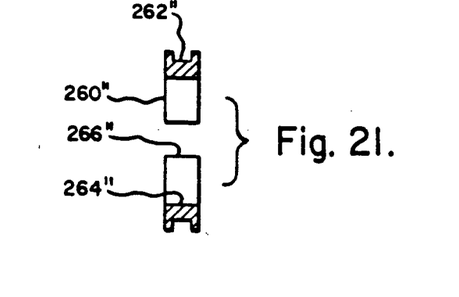
FIG. 21 is a sectional view taken about on line 21—21 in FIG. 20.

When it is desired to change the axial location of stop member 400 on piston rod 36", i.e. move it into engagement with one of the other axially spaced grooves or formations on the inner wall of housing 32", cover 410 is grasped by hand and rotated in a counter-clockwise direction as viewed in FIG. 17 to the position shown in FIG. 18 where the cover opening is in registry with an opening 430 in the wall of housing 32". During this movement of cover 410, formations 412 and 414 flex radially outwardly, this being facilitated by the inclined surfaces 418 and 422 as shown in FIG. 18. With cover 410 being in the open position, the person making the adjustment reaches in with a finger to manually rotate stop member 400 to the position shown in FIG. 18 where lobes 402 and 404 are out of engagement with housing grooves 246" and 248". Stop member 400 then is moved manually along piston rod 36" to an axial location in registry with another set of the housing grooves or formations and then rotated by hand to place lobes 402, 404 in engagement with these grooves. Then cover 410 is rotated by hand back to the closed position of FIG. 17.

It is therefore apparent that the present invention accomplishes its intended objects. While embodiments of the present invention have been described in detail, that is for the purpose of illustration, not limitation.

We claim:

1. In a fluid device including a piston and a cylinder wherein relative movement between said piston and cylinder is influenced by fluid in said device, an arrangement for limiting the extent of relative movement between said piston and cylinder in said device comprising:

(a) a housing having a longitudinal axis and carried by said device;

(b) said housing having an inner surface of cross-sectional dimension enabling one end of said cylinder to move along within said housing;

(c) at least one formation on said housing inner surface;

(d) a stop member within said housing having a portion adapted to engage said formation in a manner establishing a fixed position of said stop member along said housing longitudinal axis; and (e) means for supporting said stop member within said housing for movement between a first position wherein said stop member portion engages said formation and a second position wherein said stop member portion is out of engagement with said formation;

(f) so that said stop member in said first position acts as an abutment to contact said cylinder upon movement of said cylinder into said housing thereby limiting the extent of relative movement between said cylinder said piston.

2. Apparatus according to claim 1, further including at least one additional formation on said housing inner surface spaced from said one formation in the direction of movement of said cylinder along the longitudinal axis of said housing, and wherein said supporting means allows movement of said stop member along said axis to said one additional formation, so that said stop member is movable into engagement with said additional formation to contact said piston at a different location along the direction of movement of said cylinder in said housing.

3. Apparatus according to claim 1, wherein said stop member is in the form of a disc for contacting said cylinder around the circumference thereof.

4. Apparatus according to claim 1, wherein said housing is generally cylindrical, said formation is an arcuate groove along the inner surface of said housing, and said stop member is in the form of a disc having at least one lobe along a portion of the circumference thereof, said lobe being in and out of said groove in said first and second positions, respectively, of said stop member.

5. Apparatus according to claim 4, wherein said formation comprises spaced-apart arcuate grooves in diametrically opposite locations along the inner circumference of said housing and wherein said disc has a pair of lobes at diametrically opposite locations along the circumference of said disc.

6. Apparatus according to claim 1, further including means for releasably holding said stop member in said first position.

7. Apparatus according to claim 1, wherein said supporting means comprises piston rod means extending along the longitudinal axis of said housing, said stop member being rotatable on said piston rod means between said first and second positions.

8. Apparatus according to claim 7, wherein said housing is generally cylindrical, said formation is an arcuate groove along the inner surface of said housing, and said stop member is in the form of a disc having at least one lobe along a portion of the circumference thereof, said lobe being in and out of said groove in said first and second positions, respectively, of said stop means upon rotation thereof about said piston rod means.

9. Apparatus according to claim 7, further including at least one additional formation on said housing inner surface spaced from said one formation along said housing longitudinal axis, said stop member being axially movable along said piston rod means to the location of said additional formation so that said stop member is rotatable into engagement with said additional formation to contact said piston at a different location along the longitudinal axis of said housing.

10. Apparatus according to claim 7, wherein said supporting means is in the form of a disc for contacting said piston around the circumference thereof, said disc having a lobe along a portion of the circumference thereof for movement into and out of engagement with said formation when said disc is rotated on said piston rod means between said first and second positions.

11. Apparatus according to claim 1, further including a cover movably mounted on said housing and means on said stop member operatively coupled to said cover so that movement of said cover on said housing moves said stop member between said first and second positions.

12. Apparatus according to claim 11, further including means operatively associated with said cover for releasably maintaining said stop member in said first position.

13. Apparatus according to claim 2, further including:
(a) a cover movably mounted on said housing;
(b) means on said stop member operatively coupled to said cover so that movement of said cover on said housing means said stop member between said first and second positions; and
(c) means on said cover for guiding movement of said stop member along the longitudinal axis of said housing to said additional formation.

14. Apparatus according to claim 13, further including means operatively associated with said cover for releasably maintaining said stop member in said first position.

15. Apparatus according to claim 1, further including a cover movably mounted on said housing between a closed position and an open position allowing access to said stop member for moving the same.

16. Apparatus according to claim 15, further including means operatively associated with said cover and said stop member for releasably maintaining said stop member in said first position when said cover is in closed position.

17. In a fluid device including a piston and a cylinder wherein relative movement between said piston and cylinder is influenced by fluid in said device, an arrangement for limiting the extent of relative movement between said piston and cylinder in said device comprising:
(a) a generally cylindrical housing having a longitudinal axis and carried by said device, said housing having an inner surface of cross-sectional dimension enabling one end of said cylinder to move along within said housing;
(b) a plurality of formations at axially spaced locations along said housing inner surface, each of said formations comprising an arcuate groove disposed in a plane substantially perpendicular to said housing longitudinal axis;
(c) a stop member within said housing having a portion adapted to engage a selected one of said formations in a manner establishing a fixed position of said stop member along said longitudinal axis, said stop member being in the form of a disc and having a lobe along a portion of the circumference thereof adapted to fit in selected ones of said grooves;
(d) means for supporting said stop member within said housing for movement between a first position wherein said stop member portion engages said formation and a second position wherein said stop member portion is out of engagement with said formation, said supporting means comprising piston rod means and said disc being rotatably supported on said piston rod means between said first and second positions wherein said lobe is in and out of said groove, respectively, said disc being axially movable along said piston rod means to said locations of said axially spaced formations;
(e) so that said disc in said first position acts as an abutment to contact said cylinder upon movement of said cylinder into said housing thereby limiting the extent of relative movement between said cylinder and said piston; and
(f) so that said disc when rotated to said second position is movable axially along said piston rod means to another one of said locations whereupon said disc is rotatable to place said lobe in the groove at said location for contacting said cylinder at another location along said longitudinal axis.

18. Apparatus according to claim 17, wherein said formation comprises spaced-apart arcuate grooves in diametrically opposite locations around the inner surface of said housing, and wherein said disc has a pair of lobes at diametrically opposite locations along the circumference of said disc for movement into and out of said grooves.

19. Apparatus according to claim 17, further including means for releasably holding said disc in said first position.

20. Apparatus according to claim 17, in combination with a seat having a tiltable back for controlling the degree of tilt of the seat back, said cylinder and said piston being connected between said seat back and a fixed location and said arrangement for limiting extent of relative movement between said cylinder and said piston to limit the degree of tilt of said seat back.

21. Apparatus according to claim 17, further including:
(a) a cover movably mounted on said housing;
(b) means on said stop member operatively coupled to said cover so that movement of said cover on said housing moves said stop member between said first and second positions; and
(c) means on said cover for guiding movement of said stop member axially along said piston rod means to said axially spaced formations.

22. Apparatus according to claim 21, further including means operatively associated with said cover for releasably maintaining said stop member in said first position.

23. Apparatus according to claim 17, further including a cover movably mounted on said housing between a closed position and an open position allowing access to stop member for moving the same.

24. Apparatus according to claim 23, further including means operatively associated with said cover and said stop member for releasably maintaining said stop member in said first position when said cover is in said closed position.

25. In a fluid device including a piston and a cylinder wherein relative movement between said piston and cylinder is influenced by fluid in said device, an arrangement for limiting the extent of relative movement between said piston and cylinder in said device comprising:
(a) a housing carried by said device and located for receiving one end of said cylinder when said cylinder moves in one direction within said device;
(b) stop means located entirely within said housing and movable along a first path between a first position wherein said stop means is firmly held in said housing and a second position wherein said stop means is movable along a second path in the direction of travel of said cylinder in said housing to selected locations of additional ones of said first and second positions spaced along said second path;
(c) so that said stop means in said first position acts as an abutment to contact said one end of said cylinder upon movement of said cylinder into said housing thereby limiting the extent of relative movement between said piston and cylinder; and
(d) so that said stop means when moved to said second position is movable along said second path to a selected one of said locations whereupon said stop means is movable to said additional one of said first positions for contacting said cylinder at another location along said second path.

26. In an hydraulic cylinder locking device including a piston and a cylinder wherein relative movement between said piston and said cylinder is influenced by fluid in said device:
(a) means for defining a path for flow of working fluid in said device between opposite sides of said piston;
(b) first valve means in said working fluid path for controlling the flow thereof, said valve means including control means operable externally of said device for opening and closing said valve means;
(c) reserve fluid supply means within said device;
(d) means for defining a reserve fluid flow path between said supply and said path for flow of working fluid;
(e) second valve means in said reserve fluid path for controlling communication between said working fluid path and said reserve fluid path; and
(f) coupling means between said first and second valve means for opening said second valve means in response to opening of said first valve means and for closing said second valve means in response to closing of said second valve means so that said working fluid path and said reserve fluid path are in communication when working fluid flows between opposite sides of said piston.

27. Apparatus according to claim 26, further including an arrangement on one end of said device for limiting extent of movement of said cylinder.

28. In an hydraulic cylinder locking device including a piston and a cylinder wherein relative movement between said piston and said cylinder is influenced by fluid in said device:
(a) means for defining a path for flow of working fluid in said device between opposite sides of said piston;
(b) first valve means in said working fluid path for controlling the flow thereof, said valve means including control means operable externally of said device for opening and closing said valve means;
(c) reserve fluid supply means within said device, said reserve fluid supply means comprising a reserve cylinder having an open end in communication with said reserve fluid flow path and a closed end, reserve piston means movable within said reserve cylinders, and biasing means between said reserve piston means and said closed end of said reserve cylinder;
(d) means for defining a reserve fluid flow path between said supply and said path for flow of working fluid;
(e) second valve means in said reserve fluid path for controlling communication between said working fluid path and said reserve fluid path; and
(f) coupling means between said first and second valve means for opening and closing said second valve means in response to opening and closing of said first valve means so that said working fluid path and said reserve fluid path are in communication when working fluid flows between opposite sides of said piston.

* * * * *